(12) United States Patent
Cook (10) Patent No.: US 8,392,959 B2
(45) Date of Patent: Mar. 5, 2013

(54) PORTABLE MEDIA ASSET (75) Inventor: Michael Cook, Flemington, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 398 days.

(21) Appl. No.: 12/485,707

(22) Filed: Jun. 16, 2009

(65) Prior Publication Data

US 2010/0319017 A1 Dec. 16, 2010

(51) Int. Cl.
*H04N 7/173* (2011.01)
(52) U.S. Cl. .............. 725/133; 725/131; 725/134
(58) Field of Classification Search .......... 725/86, 725/93, 100, 105, 109, 116, 131, 132, 133, 725/134
See application file for complete search history.

(56) References Cited

U.S. PATENT DOCUMENTS

| | | | |
|---|---|---|---|
| 6,064,380 A * | 5/2000 | Swenson et al. | 715/273 |
| 7,385,649 B2 * | 6/2008 | Yamada | 348/559 |
| 7,904,505 B2 * | 3/2011 | Rakers et al. | 709/203 |
| 2007/0143782 A1 * | 6/2007 | Lakamp et al. | 725/25 |
| 2007/0288986 A1 * | 12/2007 | Candelore et al. | 725/132 |
| 2008/0152305 A1 * | 6/2008 | Ziegler | 386/94 |
| 2008/0163330 A1 | 7/2008 | Sparrell | |
| 2008/0216145 A1 | 9/2008 | Barton | |
| 2008/0260161 A1 * | 10/2008 | Yokota et al. | 380/278 |
| 2009/0169004 A1 * | 7/2009 | Widergren | 380/239 |

FOREIGN PATENT DOCUMENTS

| | | |
|---|---|---|
| WO | 03/092277 | 11/2003 |
| WO | 2006/135516 | 12/2006 |
| WO | 2007/075696 | 7/2007 |

OTHER PUBLICATIONS

Search Report in European Patent Application No. 10165401, dated Jan. 17, 2011.

* cited by examiner

*Primary Examiner* — John Schnurr
(74) *Attorney, Agent, or Firm* — Banner & Witcoff, Ltd.

(57) ABSTRACT

A method, apparatus, and system are disclosed that provide for a secure download of a media asset from a video-on-demand server responsive to a user request. The media asset may be routed to a recorder device for storage purposes. The media asset may also be streamed to a set top box for (simultaneous) playback on, e.g., a television. The media asset may subsequently be played from the storage on one or more media players.

23 Claims, 7 Drawing Sheets

PORTABLE MEDIA ASSET

FIELD

Aspects described herein generally relate to computing technologies used to store a media asset. More specifically, an apparatus, method and system are described for securely receiving a media asset, storing the media asset, and playing the media asset on one or more media asset players.

BACKGROUND

The distribution of copyrighted media asset content, such as television shows, movies, songs, books, etc., has always struggled to balance several competing concerns: First, the consumers of the content would like to access the content at their convenience, which may mean, for example, starting a movie at any time the user desires. Second, the providers of that content need to prevent unauthorized viewing or copying of the content. The balance occurs as providers try to offer more user convenience but in a protected manner.

A cable television service's video on demand (VOD) feature is an example of this balance. Cable television subscribers can make a VOD request at the time of their choosing, but the request can only work within the protected confines of the cable television environment. The requested VOD content is authorized for playback only on the subscriber's set-top box terminal, thereby keeping the content secure from unauthorized copying. Similarly, a cable television subscriber may use a digital video recorder (DVR) to record broadcasted content to the DVR's hard drive, and play it back at some other time, but the recorded contents of the hard drive are not accessible to devices other than the DVR. That again helps maintain security in the system.

There remains, however, an ever-present demand for greater convenience to the user, and for greater security for the content provider.

BRIEF SUMMARY

Features described herein relate to offering users greater flexibility in how they access protected content. More specifically, a Secure Digital (SD) card may be used to store, archive, rent, and purchase a media asset, and may also coordinate with a content provider's system to ensure that only authorized devices can access the content on the card.

A control module may be hosted at a service provider's network. The control module may collect and maintain metadata associated with a user, the user's SD card(s), and a user's media player. The control module may be communicatively coupled to one or more computing devices (e.g., a video-on-demand (VOD) server) to facilitate the transmission of a media asset responsive to a request for the media asset.

An SD card recorder may be communicatively coupled with an SD card to facilitate storing a media asset on the SD card. The SD card recorder may securely connect to one or more computing devices (e.g., a VOD server) via one or more protocols to facilitate a distribution or download of a media asset to an SD card for use on one or more media players.

In some embodiments, a request for a media asset download (e.g., a VOD request) may include a request to store the asset on a portable storage device identified in the request. An approved request may result in the media asset being downloaded for viewing and transferred to the portable storage device for playback on another device. A content server may register approved storage cards and/or card recorders associated with a subscriber's account, and may use that information to approve or deny the request. In some embodiments, the card recorder may have its own data connection, independent from one used to initiate the request. The downloaded asset may be packaged to be customized for a particular target playback device.

The above discussion presents a simplified summary of aspects of features herein in order to provide a basic understanding. This summary is not an extensive overview, and is not intended to identify key or critical elements or to delineate the scope of the claims. The summary merely presents some concepts and aspects of the invention in a simplified form as a prelude to the more detailed description provided below.

BRIEF DESCRIPTION OF THE DRAWINGS

A more complete understanding of the features herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more aspects of the invention may be practiced. It is to be understood that other embodiments may be utilized and structural and functional modifications may be made without departing from the scope of the present invention.

Figure 1:
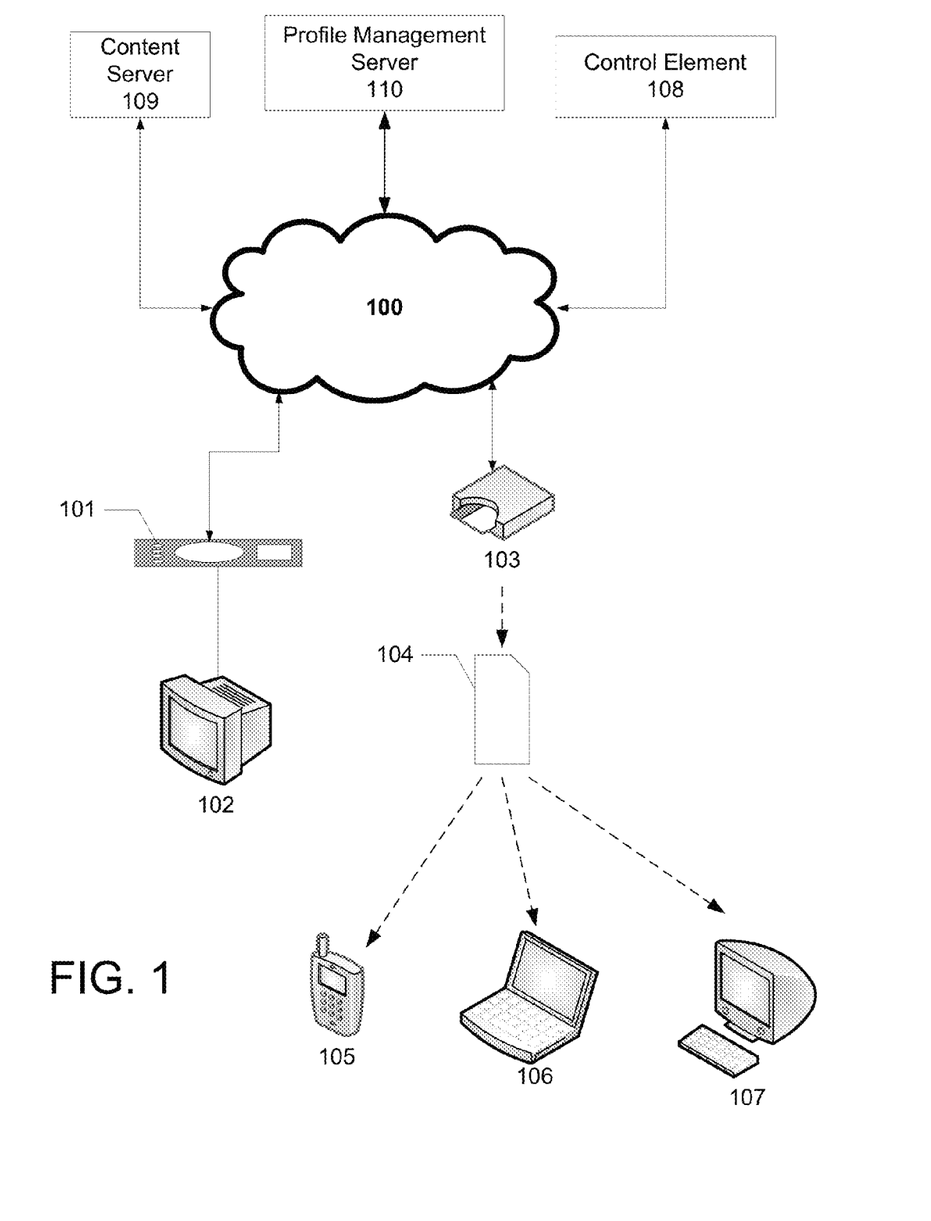
FIG. 1 illustrates a network computing environment suitable for carrying out one or more illustrative aspects described herein.

FIG. 1 illustrates an example overall system in which various features described herein may be used. At the center of the system is a network 100. The network 100 may be any desired type of communication network. For example, the network 100 may physically be a coaxial cable network, hybrid fiber/coax network, twisted-pair telephone network, fiber network, satellite network, cellular telephone network, or any other desired type of network, and may be a combination of such networks. Logically, the network 100 may communicate using any desired transport protocol, such as Internet Protocol (IP), coaxial cable protocol (e.g., DOCSIS), fiber optic protocol, or any other desired protocol, and may include any combination of such protocols as well.

On the subscriber side, the individual subscriber may have a set-top box (STB) 101 and a television 102, connected via any desired form of connection (e.g., video cables, component, HDMI, etc.). The STB 101 may be connected to the network 100, and may receive television content from the local cable company, and the content may then be displayed on the subscriber's television 102 for viewing. Other types of data may be obtained as well, such as music, Internet data, and others, and other types of end devices may be used as well, such as computers. As an alternative, the STB 101 may be a CableCard smart card inserted into television 102, or any other computing device that is permitted to access otherwise restricted content.

The subscriber may also have a card recorder 103, which may be integrated with (or apart from) the STB 101. The card recorder 103 may be configured to pull content off of the STB 101's internal DVR hard drive, or to receive decrypted/decoded content from STB 101, and store it onto a portable electronic storage device. In other words, the card recorder 103 allows the user to store content normally obtained via the STB 101, and record that content (in a protected form) on card 104. The card 104 may be a secure flash memory card, such as an SD card. Then, the subscriber may remove the card from the card recorder 103, and may insert the card 104 into another device, such as a phone 105, laptop computer 106, desktop computer 107, or other device, and play back the content in a secure manner.

To support that function, the example system may include a variety of computers and servers. As will be discussed in more detail below, there may be a control element 108 that is responsible for managing subscriber requests to download and copy content; a content server 109 (e.g., a VOD server for video on demand, a music server for music, etc.) that provides that content to the subscriber, and a profile management server 110 that can help keep track of which users and devices are allowed to access the content being provided. The operation of all of these elements will be discussed in greater detail further below, after a closer look at the elements themselves.

Figure 2:
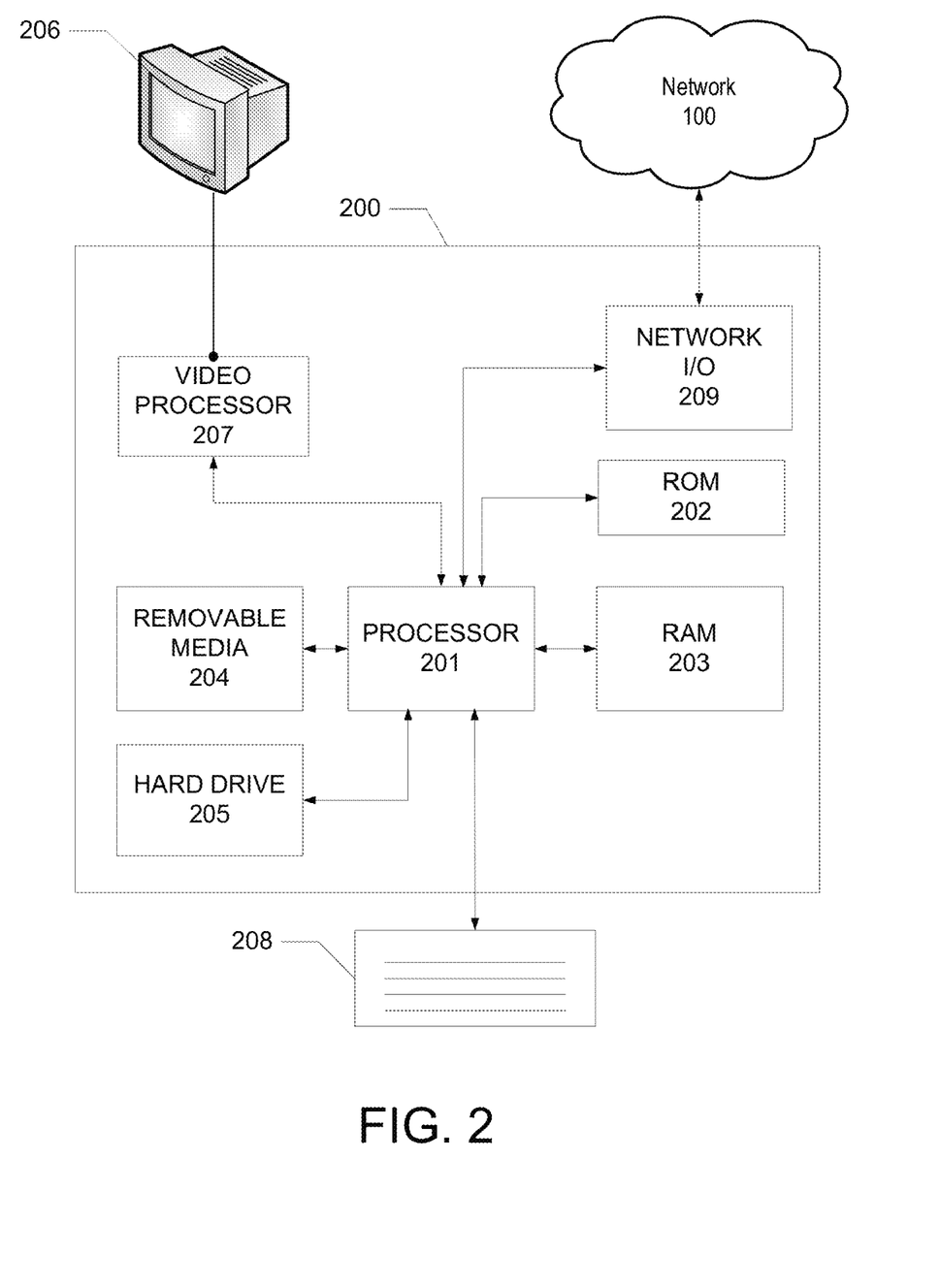
FIG. 2 illustrates a computing device architecture suitable for carrying out one or more illustrative aspects described herein.

FIG. 2 illustrates a general computing device that can be used to implement any of the various elements discussed above with respect to FIG. 1. Those elements may simply be any type of computing device. The computing device 200 may include one or more processors 201, which may execute instructions of a computer program to perform any of the features described herein. Those instructions may be stored in any type of memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television connected to a set-top box), and may include one or more output device controllers 207, such as a video processor. There may also be one or more user input devices 208, such as a remote control, keyboard, mouse, touch screen, microphone, etc. The computing device 200 may also include one or more network input/output circuits 209, such as a network card, to communicate with an external network 100. The network interface may be a wired interface, wireless interface, or a combination of the two. In some embodiments, the interface 209 may include a cable modem, and network 100 may include a cable television system's coaxial, fiber, or hybrid fiber/coaxial distribution system (e.g., a DOCSIS network).

Device 200 shown in FIG. 2 is merely illustrative. Additional or alternative components may be used in some embodiments. For example, the components used in a particular implementation may be dependent on the communication standards or equipment supported by display device 206 or the entity responsible for generating or transmitting an incoming signal received from network 210. Additionally, the various lines, interconnections and boxes are shown for ease of explanation, and other configurations may be used as desired (e.g., dividing a component into multiple components, combining them, inserting additional elements between them, alternate wiring, etc.).

Figure 3:
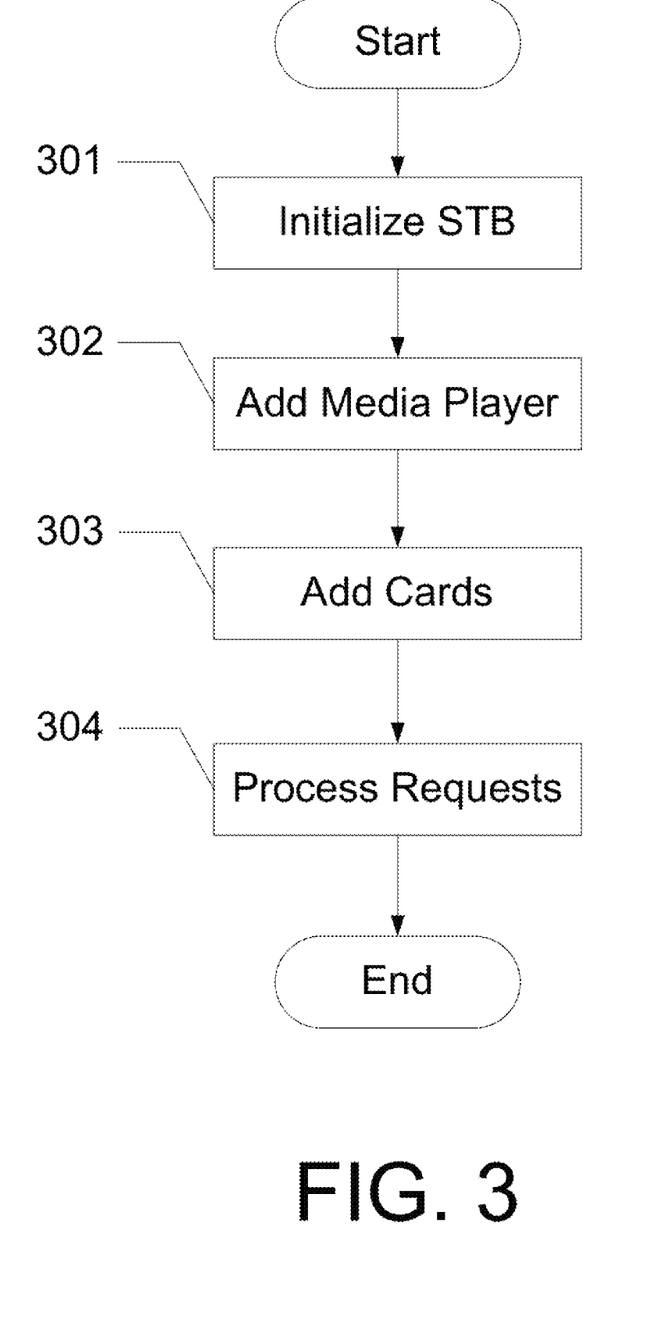
FIG. 3 illustrates a registration process that may be used with one or more illustrative aspects described herein.

FIG. 3 illustrates example steps in a configuration process that may be used to configure the system described above. In step 301, the subscriber's set-top box (STB) may be initialized for service. This may involve, for example, connecting the STB to a communication network 100, and having the STB communicate with a control element 108, which may be a server at a cable television headend, to register itself for service. As part of the registration, the STB may provide to the control element 108 information identifying the STB and the corresponding subscriber. The information identifying the STB may be any desired identifier, such as a Media Access Control (MAC) address that may be loaded into the firmware or hardware of the STB 101. The information identifying the user may simply be a user identifier, such as a textual name, address, numerical code, account number, etc. The control element 108 may record this information as a subscriber profile in a database stored in a memory of the profile management server 110. That subscriber profile information may also include information identifying the type(s) of service to which the particular subscriber is subscribed.

When the subscriber has been initialized, the subscriber will then be able to access content provided by the content server 109. For example, the subscriber can set the STB to receive channel 251, and the STB may receive and decode a data stream (e.g., an MPEG stream over DOCSIS connection) from the content server 109 containing the media assets or content of the requested channel 251. The subscriber may also transmit upstream requests for content, such as on-demand movies, television shows, songs, etc.

Thus far, the system has authorized the subscriber to access content on STB 101, and that content may be supplied to a device, such as television 102, for display to the user. If the subscriber wishes to access the content on a different device, however, the control element 108 may wish to be informed of that fact. In step 302, the subscriber may inform the control element 108 of the additional devices or media players (e.g., cell phone 105, laptop computer 106, desktop computer 107, etc.). To do so, the subscriber may supply information identifying the subscriber and the additional devices to the control element 108. This can be done, for example, using an Internet page on which the user enters information identifying the additional devices. The information identifying the devices may be another MAC address, model number, serial number, etc. In some embodiments, the Internet page may provide a pull-down listing of various media player devices and/or device types that are supported. Alternatively, the media players themselves may be configured with software instructions that would transmit their own identification along with requests for content, as will be discussed below.

When the user identifies the media player devices, the control element 108 may then update the subscriber's profile information on the profile management server 110 to indicate that the subscriber has those additional media player devices, storing a database that correlates a subscriber with the subscriber's provisioned STB (or the CableCard associated with the subscriber), and one or more other media devices for playback. For example, the database at the profile management server 110 may include data fields listing the identifiers for the subscriber, the subscriber's STB, and the subscriber's other media players. The profile may also store other data associated with the user, such as viewing preferences (e.g., standard or high definition television, volume preferences, service subscription level—permitted and prohibited channels and content, etc.). The control element 108 may also have the profile management server 110 store media player profile information for the various media players of the subscriber. For example, the profile for a cell phone media player may identify the subscriber owning the player, the identifier of the player, the identifier of a recorder, the display resolution and/or video/audio format(s) supported by the player, digital rights management functionality supported by the player, codecs (coding and/or decoding modules) loaded on the player, etc.).

In some embodiments, the control element may impose a limit on the number of media devices that a particular subscriber is permitted to have associated with their account. So, for example, a subscriber might only be permitted to identify 2 other devices, besides their STB 101, on which content may be accessed. The limits may have time values associated with them as well, such as only allowing a limited number of authorized devices for any given time period. For example, a system may limit a subscriber to only 2 new media devices per month or 30-day period. Such limits may be useful for ensuring that a subscriber does not simply use their account to freely distribute unauthorized copies of content.

In addition to storing profile information for the subscribers and their media players, the profile management server 110 may also store profile information for the various media assets available from the content server 109. The asset profile information may include information identifying the asset (e.g., a title, event code, etc.), characteristic information (e.g., number/type of audio channels, language tracks, different resolutions or aspect ratios available) and usage permissions (e.g., business rules governing access—charge per access, time limit of access, number of accesses, levels of service subscription permitted access, etc.).

To get the content onto the media player devices other than the STB, the subscriber may wish to use a portable storage device, such as an SD card, to store the content. In step 303, the user may provide card identification information to the control element 108, much in the same way as done with the media player identification above. The card identification element may include a similar type of identifier as with the media player (e.g., a MAC address, media key block value or hash thereof, serial number, card code, etc.). The control element 108 may update the subscriber's profile on the profile management server to indicate that the particular subscriber intends to use the identified memory cards on the identified media player devices, storing a database that correlates a subscriber with one or more STBs (or CableCards), one or more identified SD cards, and one or more media players. The database may have entries similar to the following:

[SUBSCRIBER 1 ID]
   [STB 1 ID]
   [CABLECARD 1 ID]
   [MEDIA PLAYER 1 ID]
   [MEDIA PLAYER 2 ID]
   [SD CARD 1 ID]
   [SD CARD 2 ID]
[SUBSCRIBER 2 ID]
   [STB 1 ID]
   [SD CARD 1 ID]

As with the media players, the control element 108 may also limit the number of SD cards that a particular subscriber is permitted to use with the system.

When the subscriber's media players and cards are identified, the system may then be ready to receive requests to record content on, or transfer content to, those other media players. Those are illustrated in step 304, but are discussed in greater detail in the following figures, which show various use scenarios.

Figure 4:
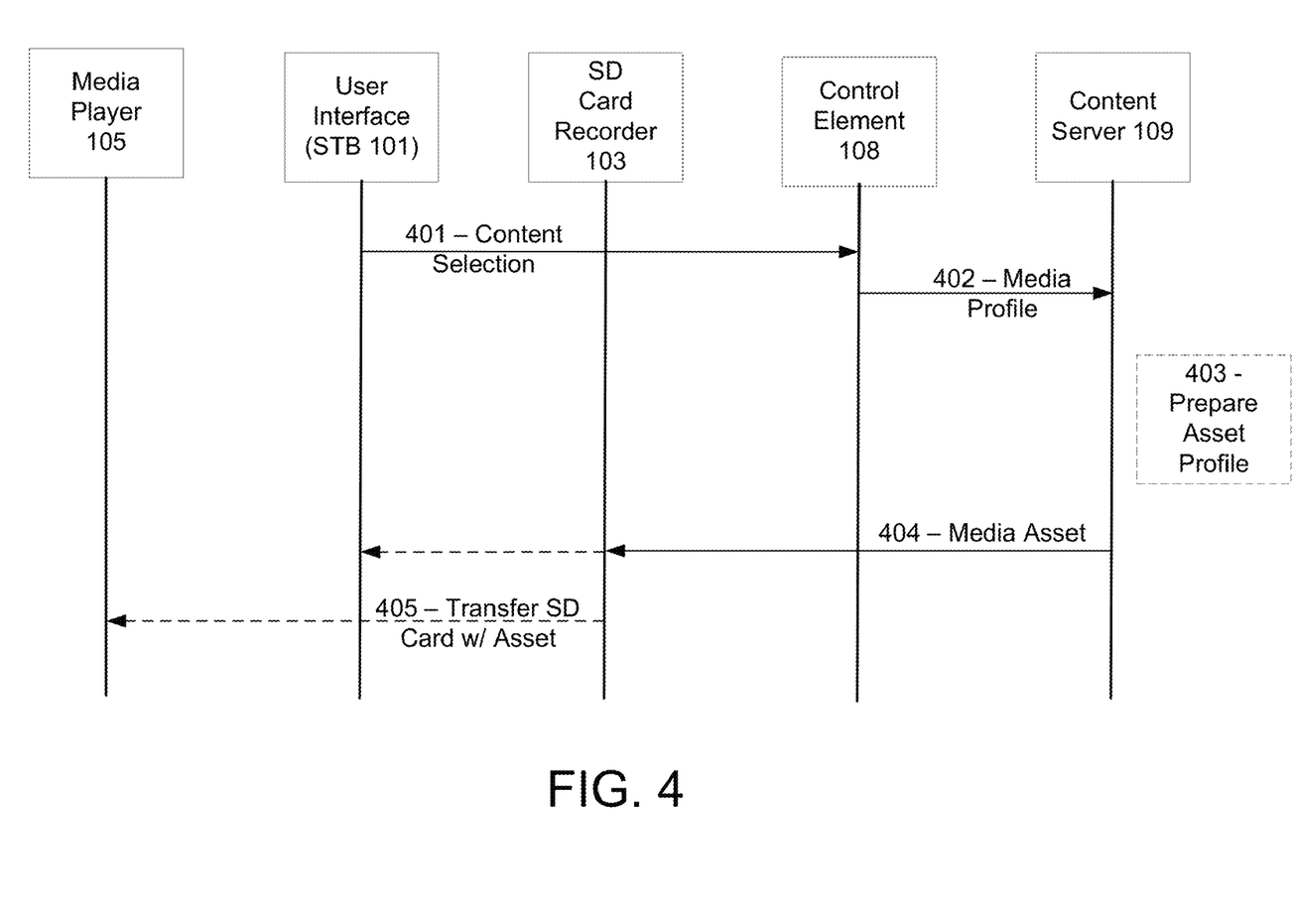
FIGS. 4-7 illustrate information flows for use cases in accordance with the features described herein.

In FIG. 4, the most basic use scenario may occur when the user has an edge device, such as a STB, that includes a hosted card recorder (e.g., a STB having a card recorder 103 embedded within). Referring to FIG. 1, this embodiment does not require the card recorder 103 to have its own connection to the network 100. Instead, the card recorder can directly communicate with the STB 101, and use the STB 101's existing connection to the network 100 to ultimately obtain the desired content over the network 100.

As illustrated, the subscriber may access a user interface to view listings of available content. The user interface may be presented on the television 102 as, for example, an electronic program guide (EPG). From the EPG listing, the subscriber may choose a listing for a media asset (e.g., a particular episode of "Lost," a song, a program or other data), and the user interface (via the STB 101) may transmit a content selection message to the content server 109, identifying the media asset that the subscriber is requesting. This message may be transmitted, for example, as an upstream DOCSIS communication over the STB's existing coaxial connection with a cable television head-end.

The content selection message 401 may also indicate the type of use requested. For example, the message can identify whether the content is being requested for a rental, or for a purchase. The message can also identify the media playback device that will be used to view the requested content (e.g., identifying the STB 101 and television 102, or laptop 106, etc.), and can also identify what storage medium will be used to store the content (e.g., stored within the STB 101's internal hard drive, or stored on the SD card by card recorder 103) and what recording device (e.g., recorder 103) will be used.

In step 402, the control element 108 may approve/disapprove of the requested download, and if approved, it may prepare a media profile message to inform the content server 109 of the type of content to provide to the user. In doing so, the control element 108 may access one or more databases at the profile management server 110 to obtain profile information relevant to the request. For example, the control element 108 may obtain the subscriber's subscription level and the required level for accessing the requested content, and determine whether this particular subscriber is entitled to receive the requested content, and in the requested manner (e.g., for the identified playback device, and for storage as requested). This may include, for example, checking to determine whether the identified media playback device, the card recorder 103, or the specific SD card 104 have been previously registered for this subscriber.

The control element 108 may also obtain profile information regarding the identified media playback device, such as the device's display resolution, sound channels supported, colors depth, etc. For example, if the subscriber's profile indicates that the subscriber uses a high-definition (HD) television, this information may help determine which version of the show "Lost" should be supplied.

If the request is denied, the control element 108 may transmit a message to the STB 101 indicating that the request was denied, and the STB may display a message on the television 102 to that effect. However, if the request is granted, the control element 108 may transmit an authorization media profile message 402 to the content server 109. The authorization media profile message 402 may inform the content server 109 of the subscriber making the request (e.g., including an address for the STB), the requested content, and the various pieces of profile information relevant to the request (e.g., identifying the media player, the card recorder, the user preferences, the digital rights management software needed, the codecs supported by the playback device, etc.)

In step 403, the content server 109 may retrieve the requested asset content, and prepare the content for delivery. For security purposes, this preparation may include encrypting the content in a manner that will only allow the identified media playback device to decrypt and render the content. For example, the MAC address of the playback device may serve as the decryption key for the encryption performed by the content server 109.

Alternatively, the content may be protected by usage restrictions transmitted with the content. The content server 109 may prepare an asset profile containing additional information regarding the content being provided. For example, the asset profile may include a set of business rules identifying the permitted uses of the content being provided. The business rules may be, for example, time restrictions (e.g., the content is a rental and may be viewed/retained for only 36 hours from the initial purchase), and/or access count restrictions (e.g., the content may only be viewed 3 times). The asset profile may include information identifying the media playback device(s) that are permitted to play back the content. For example, the asset profile may include an SD card recorder ID, identifying recorder 103 as being permitted to play back the content. The asset profile may also include a media profile, identifying characteristics of the content (similar to the media profile discussed above, identifying the resolution, video format, DRM, etc.).

Then, in step 404, the content server 109 may initiate a download stream to transfer the requested content to the STB 101 for playback and/or the identified card recorder 103, and the card recorder 103 may store the content on the SD card in its secure, encrypted format. This download may also include the asset profile. The SD card may then be placed in the media playback device 105, which may then decrypt the content using the device's own MAC address as a decryption key. The SD card (which may have its own computing logic like the computing devices in FIG. 2) may also implement any usage restrictions provided in the asset profile. Alternatively, these restrictions may be implemented by the media player itself.

In the description above, the initial content request 401 may include an identification of the recorder 103 and/or card 104 along with the requested content, indicating that the subscriber knows in advance that the requested content will be downloaded onto the card 104. However, the subscriber might not decide that until after the initial request, and the requests need not all occur at once. For example, a user may initially ask to simply view some video on demand content on the STB 101, and the content selection 401 may simply identify the requested content and the user (or the user's STB 101) for authorization, and the content may be authorized and downloaded for playing on the STB 101. Later, the user may decide to have the content stored on an SD card 104, and such a request may occur separately. For example, the user may signal to the STB that the content should be passed over to the card recorder 103 for storage on the SD card 104, and the STB 101 may, at that time, transmit a separate request (similar to content request 401), identifying the recorder 103 and/or card 104 and request approval for the alternate storage. Similarly, when the recorder 103 is instructed to store the content on card 104, the recorder 103 itself may transmit a request to the control element 108 for approval of the transfer, and that request may also identify itself, the card and/or the user (or the STB 101). This type of separate use of a connection by the recorder 103 is discussed further below.

Using the above example, a subscriber might start watching an on demand movie on their STB, and then decide that they would like to finish watching the movie somewhere else on a different device. The subscriber can access the STB 101 or recorder 103 interface to request that the movie content be downloaded onto the SD card. The STB 101 and/or recorder 103 may request authorization from the control element 108 to do so, and upon authorization the movie may be downloaded and stored on the SD card for playback on another device, such as the subscriber's laptop computer for watching while on a vacation away from home. The downloaded movie's asset profile may include information identifying the specific position within the movie that was last watched by the subscriber, so that the subscriber can resume watching by simply inserting the SD card into the laptop computer.

FIG. 4 illustrates one general example, and other usage scenarios may be used as well. For example, one use scenario involves the STB using an SD card as a substitute for its internal hard drive for DVR purposes (e.g., buffering received programs for trickplay functionality, such as pausing and rewinding a live television program being viewed). In this manner, the owner of the STB may use an SD card to expand on the storage capabilities of the STB, such as when the STB's internal hard drive is full, and may also store the downloaded content on the SD card for playback on a different media player. Or, the SD card can allow for a deeper trickplay experience—existing STBs with DVR hard drives have a set limit as to how much can be buffered (e.g., only the last 2 hours of an HD program, or only going back until the beginning of the current program, or only storing information for the current channel, etc.), and using an SD card as an expandable trickplay buffer may allow the viewer to pause a program longer, or rewind a program farther back than he/she otherwise could using just the STB's hard drive alone.

Figure 5:
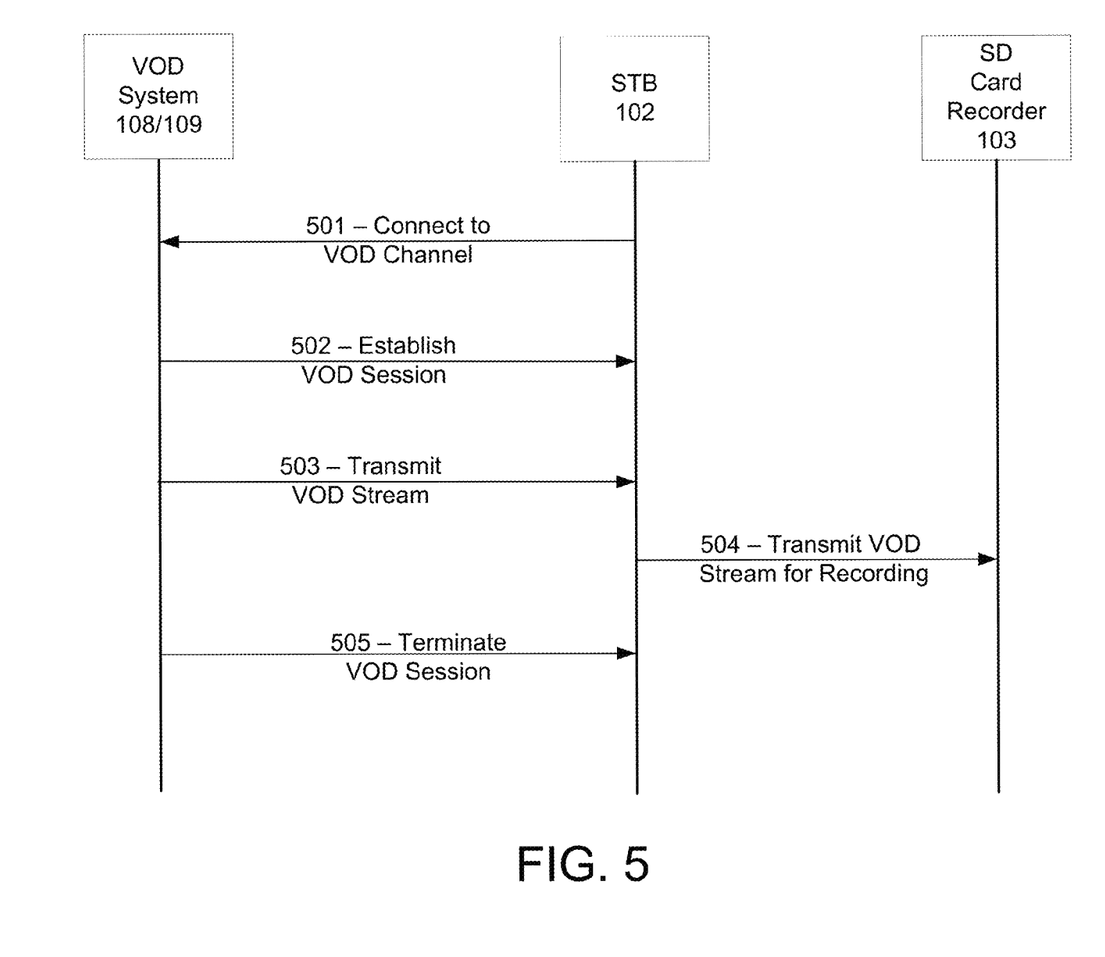

FIG. 5 illustrates an example signal flow for such an expandable SD card STB buffer. The physical configuration at the STB may have the card recorder 103 located within the STB 101, although it may alternatively be located elsewhere with a wired or wireless communication connection to the STB 101. For ease of explanation, the control element 108 and content server 109 are collectively illustrated as part of the VOD System in FIG. 5.

In step 501, the STB 101 may connect to the VOD system via any desired mechanism, such as an upstream DOCSIS message, and request a VOD session for the viewing of a video. In step 502, a VOD session may be established between the VOD system and the STB 101. Subsequent to establishing the VOD session, a VOD stream may be transmitted from the VOD system to the STB in step 503, providing the requested content to the subscriber. In step 504, the stream may be transmitted from the STB to the SD card recorder 103 for recording on an SD card inserted at the SD card recorder 103. Once the transmission of the stream has finished, the VOD session may be terminated in step 505.

The flow shown in FIG. 5 may provide for simultaneously storing a media asset on an SD card while playing the media asset on the STB 101 (or an associated television 102). The media asset stored on the SD card may subsequently be transferred to a media player (e.g., in a manner similar to step 406 described above in conjunction with FIG. 4). In conjunction with the flow shown in FIG. 5, the STB may include hardware, software, firmware, of any combination thereof to create, store, and/or operate in conjunction with a media profile or asset profile as described above with respect to FIG. 4. In doing so, the STB may ensure that the security of the media asset is not compromised in the path from the VOD system to the SD card recorder. For example, the VOD stream 503 may contain multiple profiles (e.g., one for a predetermined media player, and the other for the STB), and may transmit multiple versions of the content suited to the different profiles. For example, one version may have the display resolution and format for an HD television 102, while the other version may have a display resolution for a cell phone 105. The copy protection may be different as well, with each version encrypted to allow decryption by the different devices using their own decryption key (e.g., using the individual address of the STB and phone 105).

Figure 6:
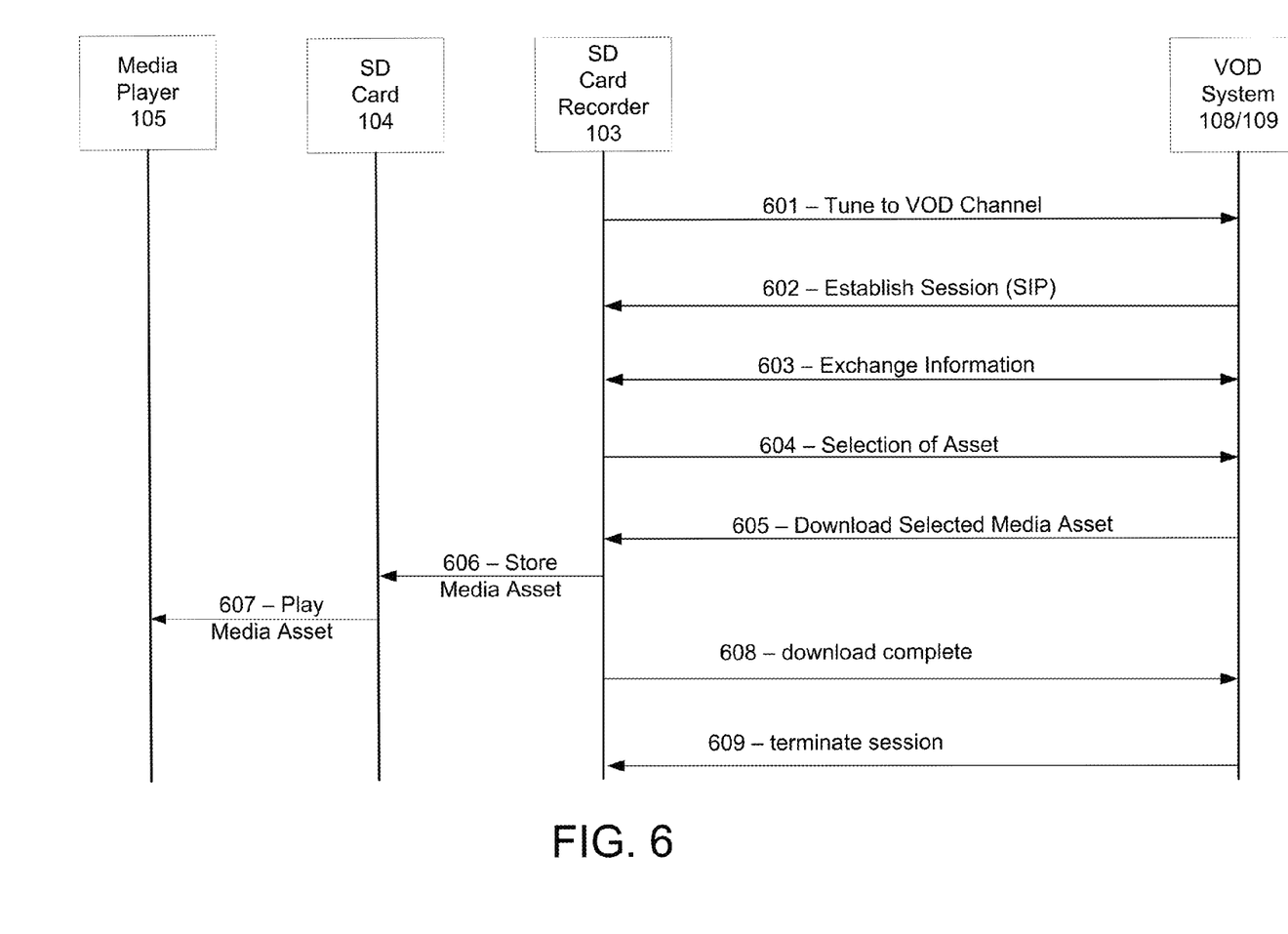

In the example use cases above, the STB 101 maintained its connection to the network 100, and to the control element 108 and content server 109 (e.g., which may be a cable television system headend), and the card recorder 103 relied on that connection to obtain the downloaded content. In alternate use cases, the card recorder 103 may have its own connection to the network 100, and may obtain the content on its own. For example, the card recorder 103 may be implemented as a standalone device, separate from the STB 101, and may have its own connection to network 100 (e.g., it may have its own IP connection). FIG. 6 illustrates an example flow for a use scenario in this configuration.

FIG. 6 illustrates a flow chart for demonstrating a downloading of a media asset to an SD card via an Internet Protocol (IP) network. In the example shown in FIG. 6, an SD card recorder service may be hosted on a separate device (e.g., implemented on a device other than a STB, such as a standalone computing device or as part of any other edge device). The IP enabled SD card recorder 103 may be connected to an IP enabled upstream VOD server (e.g., control element 108 may be an IP-enabled computing device) over a secure IP link using TLS or any other secure connection protocol. The SD card recorder 103 may be connected to media players such as a television or personal computer (PC) via IP interworking technologies such as Digital Living Network Alliance/Universal Plug and Play (DLNA/UPnP), or via other wired or wireless network connection, such as a local area network (LAN) connection. This may be used, for example, if the user wishes to have television content stored directly onto an SD card for later viewing on another device, and the local network connection can be used to stream the content from the SD card to the media player.

As shown in FIG. 6, the SD card recorder 103 may connect to the VOD system by tuning to a VOD channel in step 601 and transmitting a request to establish a session initiation protocol (SIP) session in step 602. In step 603, information may be exchanged between the SD card recorder 103 and the VOD system to facilitate streaming a media asset using session initiation protocol/real time streaming protocol (SIP/RTSP). The exchanged information may include control information and a listing of media assets available for download from the VOD system.

In step 604, the SD card recorder 103 may provide a user interface (e.g., on its own display monitor, or on associated television or computer, or via its own integrated web server) to display a list of media assets available on the VOD server for user selection, and a user may select a media asset from the list. In step 605, the selected media asset may be downloaded from the VOD system to the SD card recorder 103. In step 606, the selected media asset may be stored on an SD card. Also, in some embodiments, while the selected media asset is being stored on the SD card, the selected media asset may also be streamed to one or more media players (not shown in FIG. 6). In step 607, the media asset may be played on a media player via DLNA. In step 608, the SD card recorder 103 may signal to the VOD system that the download is complete (and that any recording or streaming operations have also been completed). In step 609, the session may be terminated.

Note that in the FIG. 6 example, the media player 105 may be any desired type of media player, including a STB 101. In such a situation, for example, the STB 101 may decide to use the card recorder 103's own connection to the network 100 to download the content. This may be useful, for example, if the STB 101's own connection is disabled, or if the connection is already being used for another download, or if the STB 101 is otherwise occupied and cannot download the content. In such an embodiment, the STB 101 may act as the user interface instead of the card recorder 103. For example, the STB 101 may receive a command to tune to the VOD channel, and send a message to that effect to the card recorder 103 prior to step 601. Also, the listing of available media assets, and user selection of one, can be performed under the control of the STB 101, and the STB 101 may send a message to the card recorder 103 identifying the user selected media asset.

The examples discussed above describe using the same data connection for both requesting the content and receiving the content. For example, the FIG. 4 content selection message 401 may traverse over the STB 101's DOCSIS upstream signaling path, while the resulting media asset 404 may be received on the downstream portion of that same path. In alternative embodiments, different paths may be used for the request and download.

Figure 7:
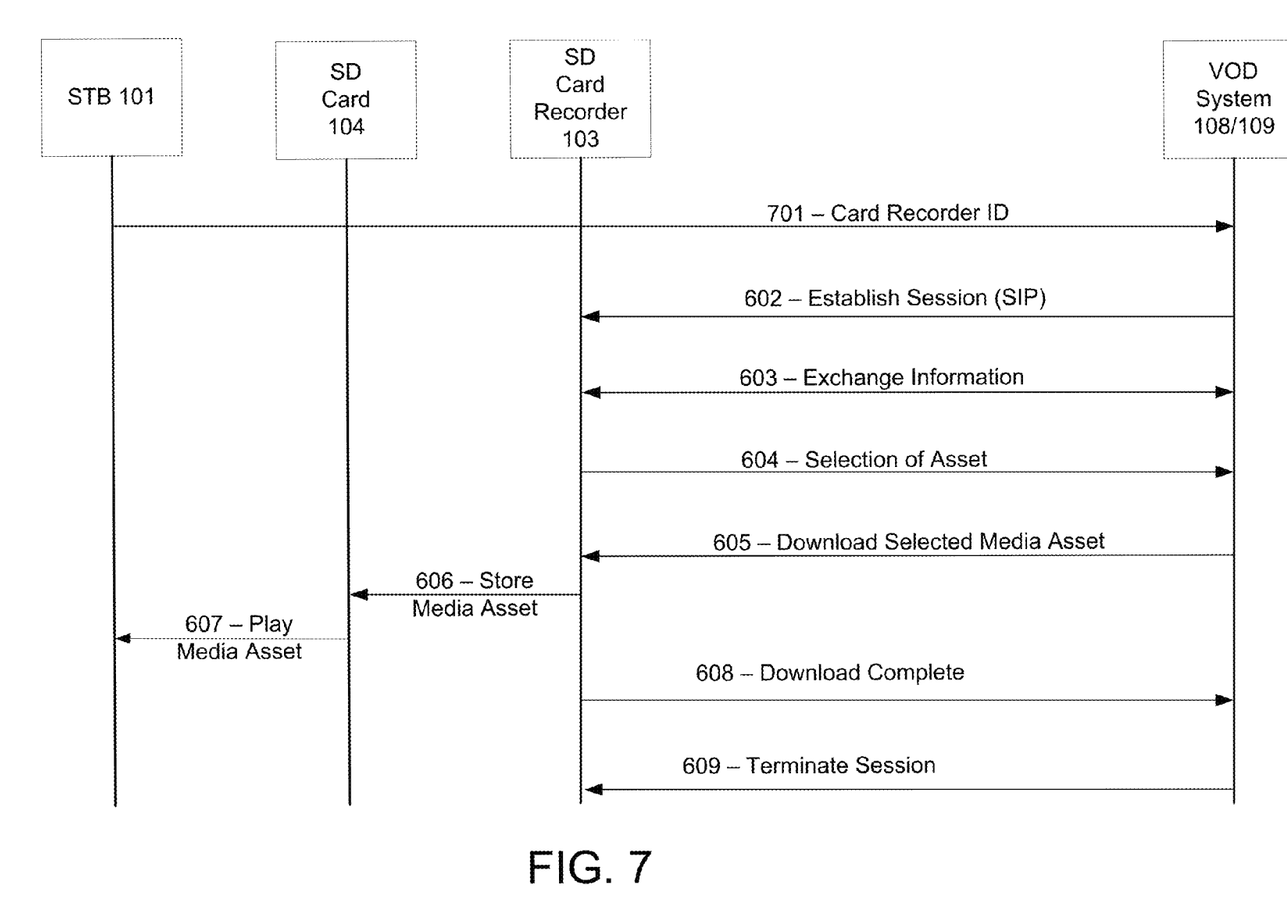

FIG. 7 illustrates an example embodiment in which different paths are used. In the FIG. 7 example, the user may interact with the STB 101 and indicate that a VOD session is requested, but that the session is to be established using a different path and to a different device. For example, the initial message 701 to the VOD system may identify another device, such as card recorder 103, as being the desired endpoint for the session. The remaining steps (602-609) in the sequence may be the same as in FIG. 6, where the VOD system 108/109 responds by requesting and establishing a connection with a third device, the identified card recorder 103, using the card recorder 103's IP connection (as opposed to the STB 101's own upstream connection) and downloads the content to the card recorder 103. The card recorder 103 may then, in turn, stream the asset to the STB 101 for playback as described above in FIG. 6. So, for example, the user may initiate the request from their STB 101, but that may result in the VOD system 108 sending a SIP invite to another device, the card recorder 103, and may establish the VOD session with that other device.

As described in the embodiments and examples above, a media asset may be played on multiple devices (e.g., PC 107 and/or cell phone 105). Transcoding techniques may be used to facilitate playing a media asset on a multitude of devices each having their own playback capabilities, while still ensuring that security is maintained (e.g., ensuring that only authorized playback of the media asset is allowed). The description provided below discusses transcoding and security techniques in greater detail.

The content associated with a media asset may be protected in some embodiments when the media asset exists external to the STB, such as when storing a media asset on an SD card. For example, VOD assets may require a higher degree of care relative to copies freely available as over the air broadcasts. At a general level, there are two types of content protection that may be available: software based protection and hardware based protection.

Various digital rights management (DRM) technologies may be available to protect media content described herein. DRM technologies include Content Protection for Recordable Medium (CPRM), Windows Media Digital Rights Management (WMDRM), Advanced Access Control System (AACS), TrustedFlash, Digital Transmission Content Protection—Internet Protocol (DTCP-IP), etc. CPRM, AACS, DTCP-IP and TrustedFlash use hardware based encryption whereas WMDRM uses a software based encryption. DTCP-IP may be used for stream protection while transferring a media asset on a secure link. In some embodiments, SD cards may implement multiple DRM schemes. Moreover, content protection solutions have been approved for media storage under, e.g., the Digital Transmission Licensing Agreement (DTLA), which include WMDRM and CPRM. In addition to hardware and software based keys, content may also be encrypted using a public key infrastructure (PKI) based encryption or a broadcast based encryption.

Stream protection from a VOD server to a STB may use existing encryption/decryption processes in conjunction with legacy VOD architectures. An appropriate content protection scheme with either software or hardware based keys may be used for storing media on an SD card.

In terms of the media players, a media player device may be approved by a CPRM authority, and that authority may grant a manufacturer of the approved media player device decryption keys or software. As such, the media player device may be able to decrypt content associated with an encrypted media asset for playback on the media player device.

As described above, media asset transcoding may be provided to facilitate the maintenance or storage of a media asset in multiple formats. For example, in legacy cable infrastructure, VOD assets may be delivered as an MPEG-2 stream to a STB (e.g., STB 101). Media players may require another media format (e.g., MPEG-4) and may support a different display resolution. As such, media transcoding may be provided to transcode VOD assets to a suitable format and resolution to play on a particular media player. In some embodiments, media transcoding functionality may be used in addition to SD card recorder functionality for playing of VOD assets on various media players. The media transcoding functionality may be hosted on an SD card recording device 103, or further upstream within a network 100, such as at the content provider 109. A compatible transcoded media asset may be offered for downloading from a VOD system based on a selection of a media player, and when multiple media players are to be used, the content provider 109 may provide multiple versions of the requested content, each version encrypted to have a target-dependent decryption key.

In some embodiments, in order to streamline media asset distribution, a headend (e.g., cable television headend, which may contain the content server 109, control element 108 and/or the profile management server 110) may store a media asset in multiple formats to support multiple media player types. For example, in embodiments where high quality of service (QoS) is required, or where incurring a delay associated with transcoding a media asset is unacceptable, a media asset may be pre-transcoded by a headend (or any other device). Furthermore, from a system level perspective, pre-transcoding a given media asset ensures that a transcoding operation is not repeatedly conducted, thereby preserving processing resources at edge devices.

In some embodiments, a decoding and/or decrypting application may be downloaded along with the requested content, and stored on the SD card, for each target playback device. The decrypting application may contain software instructions that the SD card (or a media player device in which the SD card is inserted) can execute to decrypt, decode and play back the downloaded content. In this manner, accessing the media may be simple for the user, who may simply request that the content be downloaded onto the SD card, and not have to worry about downloading separate codecs or applications to play back the content on the chosen media player.

Based on the foregoing description, a media asset may be securely downloaded to and stored on an SD card. Moreover, the secure media asset may subsequently be played from the SD card on a variety of media players when the SD card is inserted into the media players. As such, based on the description herein, a media asset may be both secure and portable.

Furthermore, based on the foregoing description, it is understood that increased flexibility may be obtained in terms of customizing media content from playback on a media player. More specifically, unlike conventional publishing/pressing techniques that are hosted by a centralized store/entity, the publishing and pressing in the foregoing description may take place at an edge device (e.g., an SD card recorder, a set top box, a media player, a personal computer, etc.). As such, users may obtain diverse media content by mixing and matching content originating from a variety of media assets. Furthermore, opportunities for peer-to-peer communications are available as the edge devices may facilitate the creation and maintenance of (local) network groups.

While the foregoing description was largely provided in terms of a video asset and a media asset, it is understood that the techniques described herein may readily be adapted to any other type of asset including images, text documents, instant messages, emails, voicemails, and the like. Furthermore, while the storage medium described for providing normalized storage was an SD card, it is understood that any other storage device may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Modifications may be made. For example, the various elements and components may be combined, subdivided and/or rearranged as desired. Described steps may be omitted as well, if an implementation would benefit from such an omission.

What is claimed is:

1. A method comprising:
    transmitting, from a requesting device, a request for a media asset download, wherein the request includes a request for authorization to store the media asset on a portable storage medium, an identification of the portable storage medium, and an identification of a target device, different from the requesting device, in which the portable storage medium will reside for the download;
    downloading the media asset and storing the media asset on the portable storage medium; and
    using the portable storage medium to extend trickplay buffer time duration of a digital video recorder of the requesting device.

2. The method of claim 1, further comprising:
    initiating playback of the media asset on the requesting device;
    prior to completing the playback of the media asset, receiving a request to temporarily halt the playback and to resume the playback on a third device;
    detecting removal of the portable storage medium from a recorder communicatively coupled to the target device; and
    detecting insertion of the portable storage medium into the third device and resuming playback of the media asset on the third device.

3. The method of claim 2, further comprising:
    in response to the request to temporarily halt playback and to resume playback on the third device, identifying a codec needed to play back the media asset on the third device, and downloading the codec along with the media asset to the portable storage medium.

4. The method of claim 3, further comprising storing a playback position along with the codec on the portable storage medium, the playback position identifying a position in the playback of the media asset at which playback is to be resumed on the third device.

5. The method of claim 1, wherein the request includes a request to grant a plurality of target media players authorization to access the downloaded media asset.

6. The method of claim 5, wherein the plurality of media players are identified in the request.

7. The method of claim 5, wherein the downloading of the media asset includes downloading multiple versions of the media asset, each of the multiple versions being secured differently to limit access to one of the target media players.

8. The method of claim 7, wherein each of the multiple versions are encrypted differently to allow decryption using information specific to one of the target media players.

9. The method of claim 5, wherein the downloading of the media asset includes downloading multiple versions of the media asset, each of the multiple versions being transcoded differently to correspond to characteristics of one of the target media players.

10. The method of claim 5, wherein one of the target media players is the target device.

11. The method of claim 1, further comprising downloading and storing a codec for the media asset on the storage medium along with the media asset.

12. The method of claim 1, wherein the request includes a request for the download to occur using a separate network connection that is an IP connection to a medium recorder associated with the portable storage medium.

13. A media access method, comprising:
storing, in an electronic storage device, media access account information identifying a media access user, an authorized media access device associated with the user's account, and an authorized removable memory medium associated with the user's account;
using the electronic storage device to authorize a future request for media content;
receiving the future request for media content from a device of the user, wherein the request identifies the authorized removable memory medium as the desired recipient of the requested media;
receiving a request to authorize an additional portable storage device for the user's account; and
determining whether to authorize the request based at least in part on a comparison between a number of previously-authorized memory media associated with the user's account, and a predetermined time-based limit on a number of new memory media permitted per account per predetermined time period.

14. The method of claim 13, further comprising:
establishing an Internet session with a memory medium recorder; and
using the Internet session to download the requested media content to the memory medium recorder, wherein the media content provided to the memory medium recorder does not pass through the user's device as part of the download.

15. The method of claim 13, further comprising:
downloading the requested media content to a second user device; and
including, with the download, an asset profile identifying usage restrictions for the downloaded media content.

16. The method of claim 13, further comprising:
generating, by the user's authorized media access device, a media content download and memory medium storage request; and
transmitting the media content download and memory medium storage request from the user's authorized media access device to a media access controller associated with the electronic storage device.

17. The method of claim 16, further comprising:
the user's authorized media access device receiving the requested media content and forwarding the content to a memory medium recorder; and
the memory medium recorder storing the media content on the authorized removable memory medium together with usage restriction information for the media content.

18. The method of claim 13, further comprising:
while presenting the requested media content to the user, receiving and granting a request to resume playback of the media content on a different device of the user; and
downloading the media content to the removable memory medium, formatted according to capabilities of the different device.

19. The method of claim 18, further comprising downloading a codec for the media content to the removable memory medium along with the media content to allow resumed playback upon insertion of the removable memory medium into the different device.

20. A method comprising:
transmitting, from a requesting device, a request for a media asset download, wherein the request includes a request for authorization to store the media asset on a portable storage medium and an identification of the portable storage medium;
downloading the media asset and storing the media asset on the portable storage medium, wherein the portable storage medium resides in the requesting device for the download; and
using the portable storage medium to extend trickplay buffer time duration of the requesting device.

21. The method of claim 20, wherein the requesting device includes a digital video recorder.

22. The method of claim 20, wherein the request includes a request to grant a plurality of media players authorization to access the downloaded media asset.

23. The method of claim 22, wherein the plurality of media players are identified in the request.

* * * * *